US012211369B2

(12) United States Patent
Barson et al.

(10) Patent No.: US 12,211,369 B2
(45) Date of Patent: Jan. 28, 2025

(54) MULTI-MODE OPERATION OF FIRE ALARM DEVICES

(71) Applicant: Honeywell International Inc., Charlotte, NC (US)

(72) Inventors: Michael Barson, Nuneaton (GB); Udayakumar Jayachandran, Leicester (GB); Marcel Streit, Cologne (DE); Alexander Friesen, Krefeld (DE)

(73) Assignee: Honeywell International Inc., Charlotte, NC (US)

( * ) Notice: Subject to any disclaimer, the term of this patent is extended or adjusted under 35 U.S.C. 154(b) by 193 days.

(21) Appl. No.: 18/098,420

(22) Filed: Jan. 18, 2023

(65) Prior Publication Data

US 2024/0242595 A1 Jul. 18, 2024

(51) Int. Cl.
*G08B 29/14* (2006.01)
*G08B 17/107* (2006.01)

(52) U.S. Cl.
CPC ......... *G08B 29/145* (2013.01); *G08B 17/107* (2013.01)

(58) Field of Classification Search
CPC .. G08B 29/145; G08B 17/107; G08B 17/113; G08B 17/00; G08B 29/00; G08B 29/043
See application file for complete search history.

(56) References Cited

U.S. PATENT DOCUMENTS 4,099,178 A * 7/1978 Ranney ................ G08B 29/145 340/630
4,227,191 A * 10/1980 Raber .................... G08B 17/00 340/636.15
4,374,329 A * 2/1983 Schoenfelder ....... G08B 17/113 340/630
4,506,255 A * 3/1985 Sasaki .................. G08B 29/145 340/502
4,623,788 A * 11/1986 Kern ..................... G08B 29/145 250/554
5,170,148 A * 12/1992 Duggan ............... G08B 29/145 340/693.5
5,170,150 A * 12/1992 Austin ................. G08B 17/113 340/630
5,264,708 A * 11/1993 Hijikata ................ G01J 1/1626 250/554
5,621,394 A 4/1997 Garrick et al.
10,210,747 B1 * 2/2019 Ainsworth ......... G01R 31/3277
11,132,891 B2 9/2021 Dearden et al.
(Continued)

FOREIGN PATENT DOCUMENTS

CN 209151402 U 7/2019
CN 108809064 B 2/2020
KR 101458688 B1 11/2014

OTHER PUBLICATIONS

Innis; Astrodyne TDI: "Switch-Mode Power Supply: Constant Voltage, Constant Current, and Constant Power"; Astrodyne TDI Application Note:, Released: Nov. 2021 (15 pgs).

*Primary Examiner* — Ryan W Sherwin
(74) *Attorney, Agent, or Firm* — Brooks, Cameron & Huebsch, PLLC

(57) ABSTRACT

Multi-mode operation of fire alarm devices is described herein. One device includes a self-test component, an alarm component, and a power supply configured to operate in a first mode to provide power to the self-test component and operate in a second mode to provide power to the alarm component.

20 Claims, 4 Drawing Sheets

(56) References Cited

U.S. PATENT DOCUMENTS

| | | | | |
|---|---|---|---|---|
| 2004/0217857 | A1* | 11/2004 | Lennartz | G08B 29/145 340/506 |
| 2012/0050030 | A1* | 3/2012 | Murphy | G08B 29/145 340/514 |
| 2012/0171987 | A1* | 7/2012 | Newman | G08B 17/00 455/404.1 |
| 2015/0020614 | A1* | 1/2015 | Gettings | G08B 29/181 73/865.8 |
| 2018/0293878 | A1 | 10/2018 | Penney et al. | |
| 2020/0402380 | A1 | 12/2020 | Barson et al. | |
| 2021/0065536 | A1* | 3/2021 | Dearden | G08B 17/10 |

* cited by examiner

MULTI-MODE OPERATION OF FIRE ALARM DEVICES

TECHNICAL FIELD

The present disclosure relates generally to multi-mode operation of fire alarm devices.

BACKGROUND

A fire alarm system can include a number of devices (e.g., alarm devices) that can detect, and/or provide a warning, when smoke, fire, and/or carbon monoxide, among other emergency situations, are present in a facility. Such warnings may be audio and/or visual warnings, for example.

A fire alarm system may be addressable. An addressable fire alarm system may utilize signaling line circuits (SLCs), which commonly may be referred to as "loops". A loop can include a control panel and a number of fire alarm system devices including, for example, alarm devices, as well as other detectors, call points, and/or interfaces. The control panel can provide power to the devices of the loop, and bi-directional communications can take place between the control panel and the devices of the loop.

DETAILED DESCRIPTION

Figure 1:
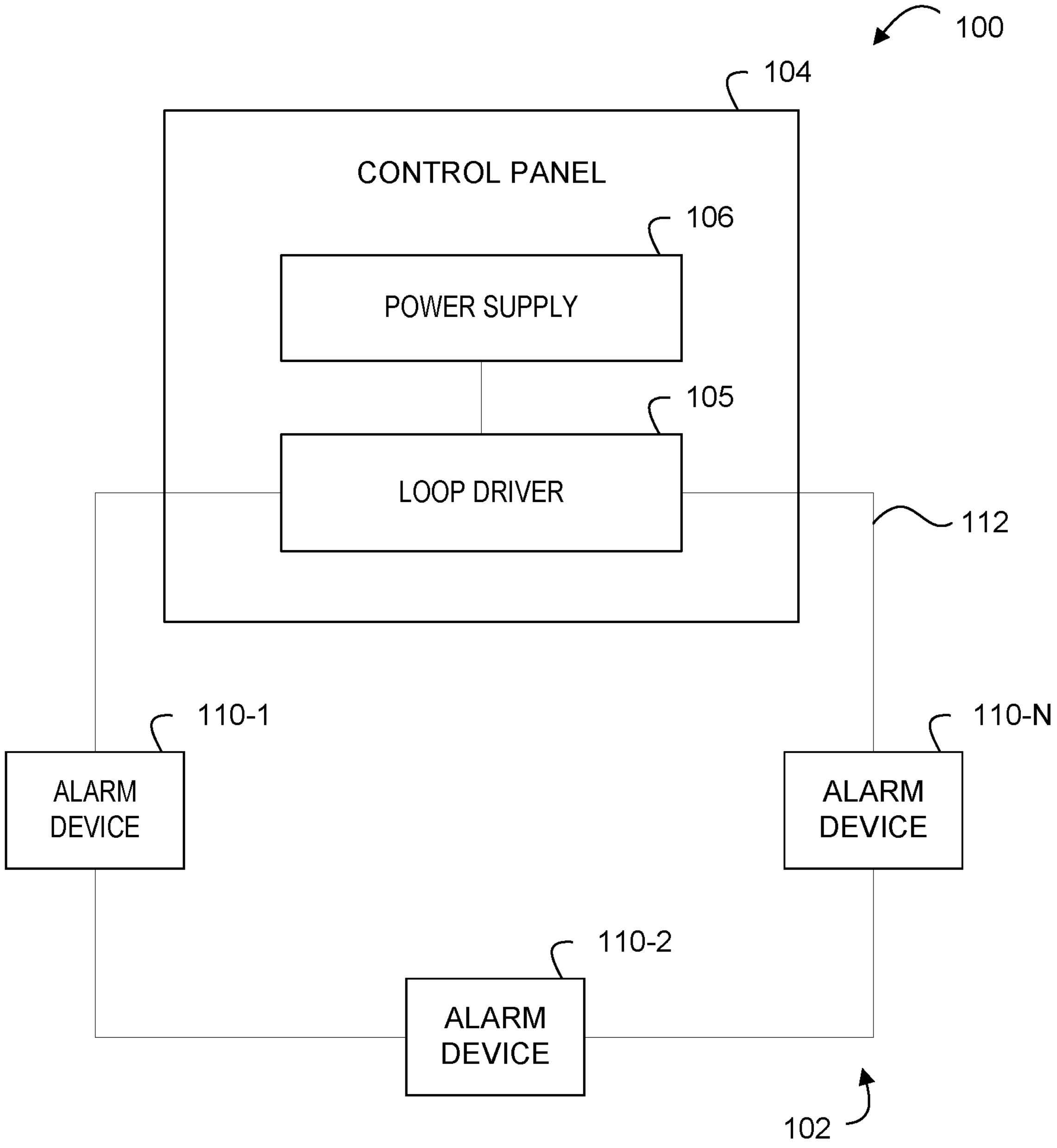
FIG. 1 illustrates an example of a fire alarm system in accordance with an embodiment of the present disclosure.

Multi-mode operation of fire alarm devices is described herein. For example, an embodiment includes an alarm device for a fire alarm system comprising a self-test component, an alarm component, and a power supply configured to operate in a first mode to provide power to the self-test component and operate in a second mode to provide power to the alarm component.

An addressable fire alarm system generally has combined power transmission and digital communications on a 2-wire loop between a control panel and a number of outstations or field devices.

The devices include fire sensors (e.g., detectors), interfaces and alarm devices. Modern systems tend to combine the alarm functions, short-circuit isolators, and input/output (I/O) functionality with the fire sensors in the same device to reduce overall system costs. A feature becoming more common with fire sensor devices is the ability to self-test. For example, testing an optical smoke sensor can include generating an aerosol stimulus at the device that is at a fire detection level and verifying that an alarm occurs responsive to that stimulus.

Fire sensing devices may include various advanced functions. For instance, in many cases, it is now not uncommon to have a voice-sounder and visual alarm device combined with the fire sensor. While adding many advanced functions into a fire sensing device may be attractive, such functions present difficulties associated with engineering within a relatively small aesthetic design and/or a reasonable product cost.

Previous approaches meet cost, size, and noise generation issues because they utilize separate switch-mode power supplies to power different functions. It is desirable therefore to control a single power supply unit (PSU) so that it can operate in different modes to power different advanced functions within the device.

Embodiments of the present disclosure include a single switch-mode power supply. The power supply can be controlled by circuitry described herein to operate in a first mode as a voltage source (e.g., during a self-test sequence) and to operate in a second mode as a current source (e.g., during an alarm condition). In some embodiments, for instance, a power supply in accordance with embodiments herein can power a self-test module of a multifunctional addressable fire alarm device in the first mode as a voltage source using negative feedback control during a self-test sequence, and can power a visual alarm component of the device (e.g., a strobe) in the second mode as a current source controlled by a digital predictive control loop to provide a low frequency filtering and power function during an alarm condition.

It is noted that while embodiments herein are discussed in the context of a power supply for a fire alarm device, the present disclosure is not so limited. A power supply in accordance with the present disclosure can be used to operate in a first mode as a voltage source and in a second mode as a current source in any suitable device where such switching is desirable.

In the example of a fire alarm device, the self-test module is used to self-test sensors of the device (e.g., optical sensors) with the power supply in the first mode. In some embodiments, the self-test module includes a heater coil. The heater coil can be coated in high temperature paraffin wax or can have a wick embedded in paraffin wax in its center. When the heater coil is switched across the power supply, a large current flows in the coil. This current can be either a direct current (DC) or pulsed alternating current (AC). In either case, the coil can be heated to a sufficiently high temperature such that a portion of the wax vaporizes and forms an aerosol.

In some embodiments, a fan is switched across the power supply using a pulse width modulation (PWM) control to regulate the fan speed. The timing of the coil heating cycle and fan speed cycle can enable the aerosol to move into an optical scatter smoke chamber for detection and to be cleared from the device via the smoke inlet paths, thereby proving smoke entry.

In the above self-test example, a sequence of testing occurs on a loop, so that only a limited number of devices of the fire alarm system will utilize heating current at the same time. Accordingly, the maximum loop current available will not be exceeded. A conventional negative feedback control loop can be configured by a controller (e.g., a microcontroller unit (MCU)) to produce a stable voltage level to power the heater coil and fan during an optical self-test. A self-test sequence will stop if a fire alarm occurs, so the same power supply can be used for each function.

In accordance with the present disclosure, the visual alarm device can utilize the same power supply reconfigured as a digitally controlled current source (e.g., operating in the second mode). In some embodiments, the current source is used to charge a super-capacitor energy store. A large pulse current can be taken out of the super-capacitor energy store using a boost converter to provide a pulse current into a chain of light-emitting diodes (LEDs) periodically (e.g., every two seconds). This low frequency (e.g., 0.5 Hz) pulse current causes the voltage on the super-capacitor to fall.

In previous approaches, a conventional negative feedback control loop would now try to correct this 'voltage error' as fast as it can and using as much current as it can. However, this would just cause a large, low frequency, synchronized pulse current to appear on the loop wiring, cumulatively for all the visual alarm devices used. Embodiments herein instead utilize a predictive control loop. The power supply, acting as a controlled current source, charges the super-capacitor energy store back-up over the complete period (e.g., two seconds) to the correct operating point, using the minimum amount of current and filtering out (e.g., completely filtering out) the low frequency load current pulses.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 112 may reference element "12" in FIG. 1, and a similar element may be referenced as 212 in FIG. 2.

As used herein, "a", "an", or "a number of" something can refer to one or more such things, while "a plurality of" something can refer to more than one such things. For example, "a number of devices" can refer to one or more devices, while "a plurality of devices" can refer to more than one device. Additionally, the designators "N" and "M" as used herein, particularly with respect to reference numerals in the drawings, indicate that a number of the particular feature so designated can be included with a number of embodiments of the present disclosure. This number may be the same or different between designations.

FIG. 1 illustrates an example of a fire alarm system 100 in accordance with a number of embodiments of the present disclosure. Fire alarm system 100 can be, for example, the fire alarm system of a facility (e.g., a building).

As shown in FIG. 1, fire alarm system 100 can include a control panel 104 that includes a loop driver 105, and a power supply 106. Control panel 104 can be, for example, an addressable fire alarm control panel. Power supply 106 can be, for example, a direct current (DC) voltage source with modulation. However, embodiments of the present disclosure are not limited to a particular type of power supply. Loop driver 105 can allow data to be exchanged between loop 102 (discussed further below) and control panel 104.

Operations of power supply 106 and/or loop driver 105 can be controlled by control panel 104. In some embodiments, fire alarm system 100 can use combined power transmission and digital communications on a screened (e.g., shielded) two-wire loop. In some embodiments, fire alarm system 100 can use combined power transmission and digital communications on an unshielded cable.

As shown in FIG. 1, fire alarm system 100 can include a number of alarm devices 110-1, 110-2, . . . , 110-N. Alarm devices 110-1, 110-2, . . . , 110-N can be devices that can detect, and/or provide a notification (e.g., warning), when smoke, fire, and/or carbon monoxide, among other emergency situations, are present in the facility, in order to alert the occupants of the facility to evacuate or take some other action.

For instance, alarm devices 110-1, 110-2, . . . , 110-N can each include an audio notification mechanism, such as a speaker, sounder, or siren (e.g., the warning provided by the device can be and/or include an audio warning), and/or a visual notification mechanism, such as a display, light, sign, or strobe (e.g., the warning provided by the device can be and/or include a visual warning). In some embodiments, the visual notification mechanism is a strobe that includes a number of light-emitting diodes (LEDs) connected in series. However, embodiments of the present disclosure are not limited to a particular type of visual notification mechanism. In some embodiments, the audio notification mechanism is a piezoelectric sounder (e.g., a piezo-sounder) that can provide multiple alarm tones and a voice message. For instance, the audio notification mechanism can be a class-D amplifier that includes a piezoelectric transducer. However, embodiments of the present disclosure are not limited to a particular type of audio notification mechanism.

As shown in FIG. 1, alarm devices 110-1, 110-2, . . . , 110-N and control panel 104 can be communicatively coupled by wiring 112 to form an addressable loop 102. Wiring 112 can carry combined power transmission and digital communications between alarm devices 110-1, 110-2, . . . , 110-N and control panel 104. For example, control panel 104 can control the operations of, and exchange data with, alarm devices 110-1, 110-2, . . . , 110-N, via wiring 112, and can provide power from power supply 106 to alarm devices 110-1, 110-2, . . . , 110-N via wiring 112. The length of loop 102 can be, for instance, greater than or equal to two kilometers.

Although not shown in FIG. 1 for clarity and so as not to obscure embodiments of the present disclosure, loop 102 can include other devices in additional to alarm device 110-1, 110-2, . . . , 110-N. For example, loop 102 can include a number of sensor devices, such as heat detectors, smoke detectors, flame detectors, fire gas detectors, water flow detectors, among other types of sensor devices. As an additional example, loop 102 can include a number of initiating devices (e.g., fire alarm boxes), pull stations, break glass stations, and/or call points, among others.

Figure 2A:
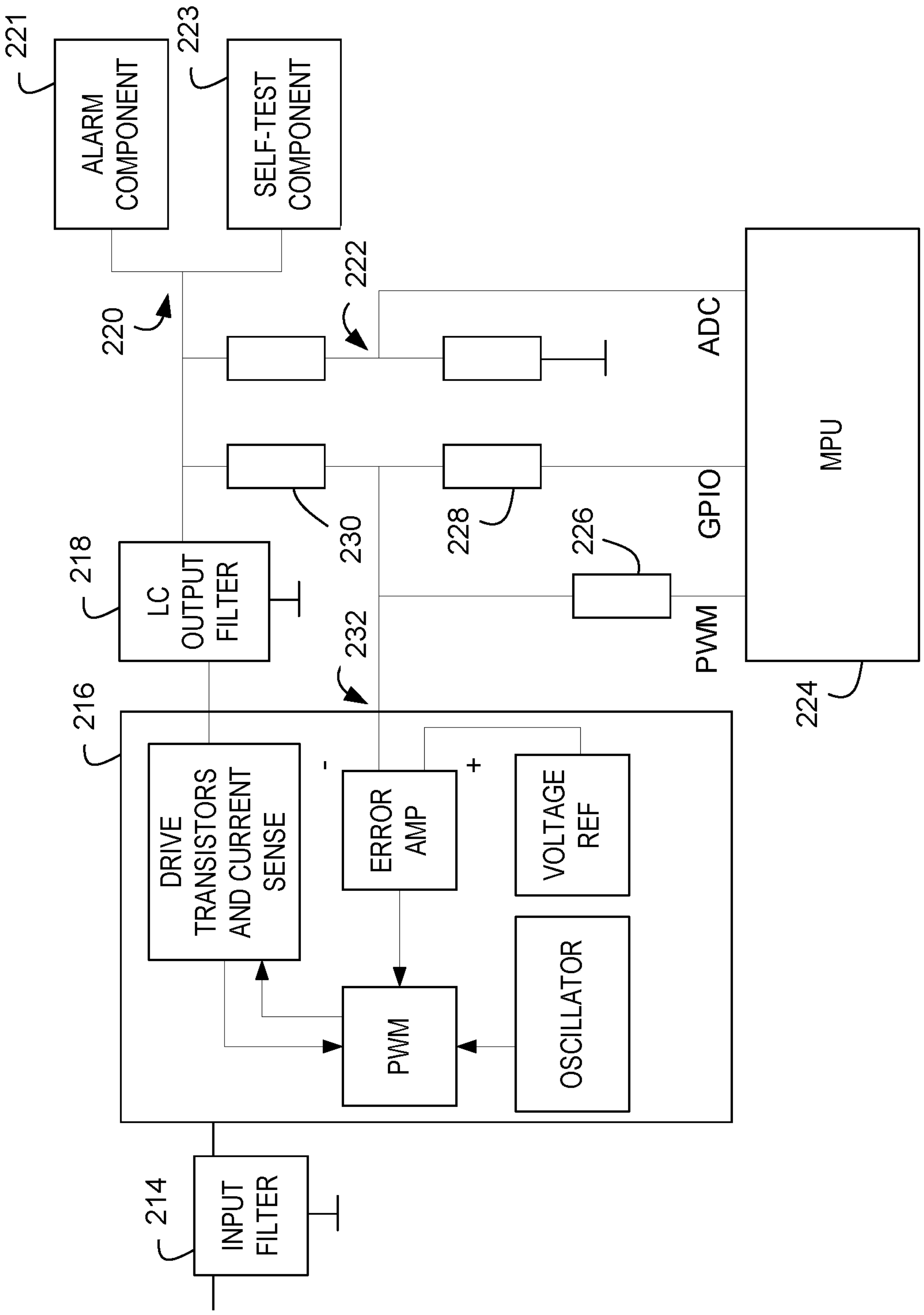
FIG. 2A illustrates a power supply circuit in accordance with a number of embodiments of the present disc.

FIG. 2A illustrates a power supply circuit in accordance with a number of embodiments of the present disclosure. The circuit illustrates in FIG. 2A includes an input filter component 214, a controller (e.g., control chip) 216, an LC output filter component 218, and an output 220 which, as discussed further below, can be switched between an alarm component 221 and a self-test component 223. As shown in FIG. 2A, the controller 216 can include a drive transistors and current sense component, a pulse width modulation component, an error amplifier component, an oscillator, and a voltage reference component, though embodiments herein are not so limited. The controller 216 can be, for instance, an interface circuit, a microcontroller and a memory (not shown in FIG. 2A for clarity and so as not to obscure embodiments of the present disclosure). The memory can be any type of storage medium that can be accessed by the microcontroller to perform various examples of the present disclosure. For example, the memory can be a non-transitory computer readable medium having computer readable instructions (e.g., computer program instructions) stored thereon that are executable by the microcontroller to perform various examples of the present disclosure. That is, the microcontroller can execute the executable instructions stored in the memory to perform various examples of the present disclosure.

The memory can be volatile or nonvolatile memory. The memory can also be removable (e.g., portable) memory, or non-removable (e.g., internal) memory. For example, the memory can be random access memory (RAM) (e.g., dynamic random access memory (DRAM), resistive random access memory (RRAM), and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

In addition, the circuit includes an analog to digital converter (ADC) component 222, a processor (e.g., microprocessing unit) 224, a pulse width modulation (PWM) component 226, feedback control resistors 228 and 230, and feedback input 232.

The processor 224 can receive commands and/or instructions from a control panel (e.g., the control panel 104) to switch between a first mode and a second mode of operation. The power supply, via the circuit illustrated in FIG. 2A, can operate in a first mode as a voltage source during a self-test sequence and can operate in a second mode as a current source during an alarm condition.

Figure 2B:
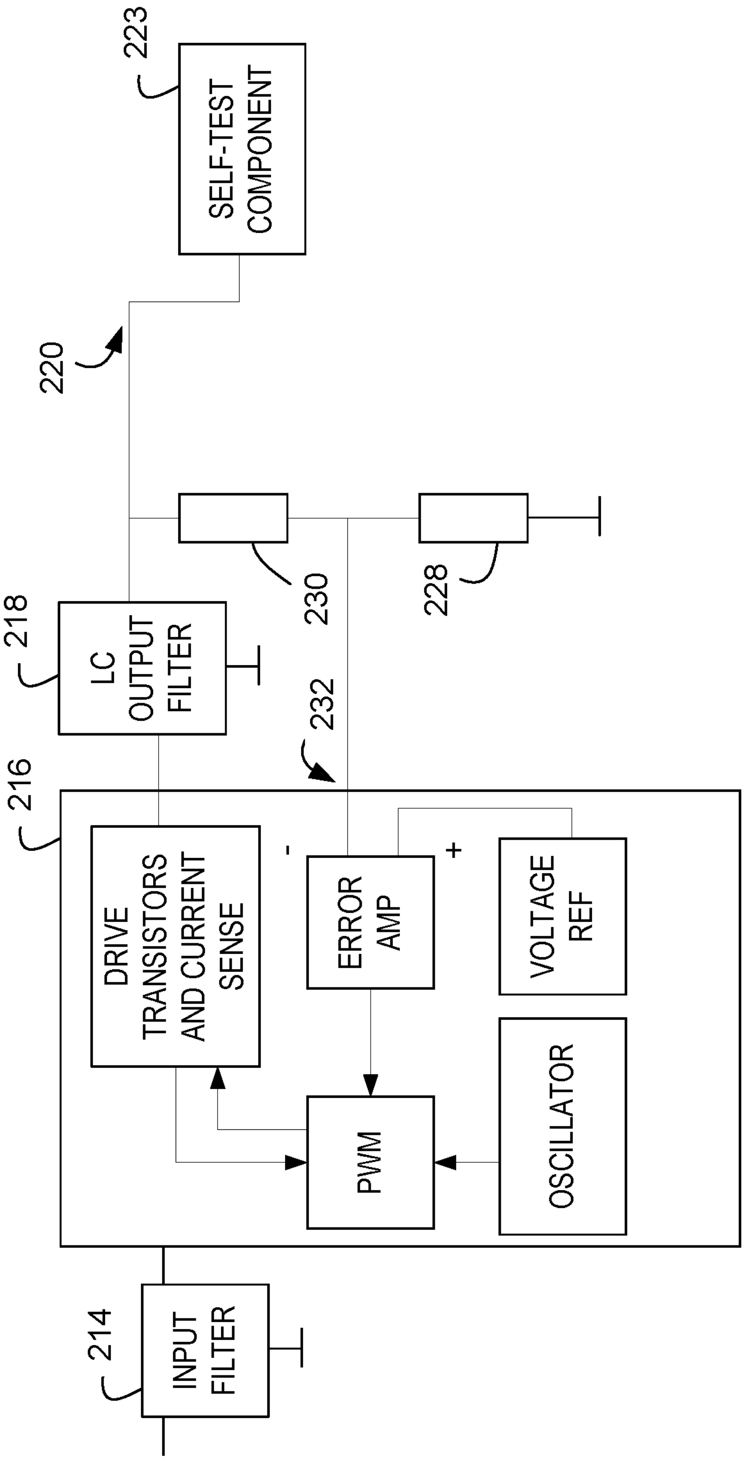
FIG. 2B illustrates components of the circuit illustrated in FIG. 2A used to power a self-test component of a fire alarm device in a first mode.

FIG. 2B illustrates components of the circuit illustrated in FIG. 2A used to power a self-test component of a fire alarm device in a first mode. More specifically, FIG. 2B illustrates components of the circuit used to power the self-test component 223 in the first mode as a voltage source using negative feedback control during a self-test sequence.

the self-test component 223 is used to self-test sensors of the device (e.g., optical sensors) with the power supply in the first mode. In some embodiments, the self-test module includes a heater coil. The heater coil can be coated in high temperature paraffin wax or can have a wick embedded in paraffin wax in its center. When the heater coil is switched across the power supply, a large current flows in the coil. This current can be either a direct current (DC) or pulsed alternating current (AC). In either case, the coil can be heated to a sufficiently high temperature such that a portion of the wax vaporizes and forms an aerosol.

In some embodiments, a fan is switched across the power supply using a pulse width modulation (PWM) control to regulate the fan speed. The timing of the coil heating cycle and fan speed cycle can enable the aerosol to move into an optical scatter smoke chamber for detection and to be cleared from the device via the smoke inlet paths, thereby proving smoke entry.

In the above self-test example, a sequence of testing occurs on a loop, so that only a limited number of devices of the fire alarm system will utilize heating current at the same time. Accordingly, the maximum loop current available will not be exceeded. A conventional negative feedback control loop can be configured by a controller (e.g., a microcontroller unit (MCU)) to produce a stable voltage level to power the heater coil and fan during an optical self-test. A self-test sequence will stop if a fire alarm occurs, so the same power supply can be used for each function.

Figure 2C:
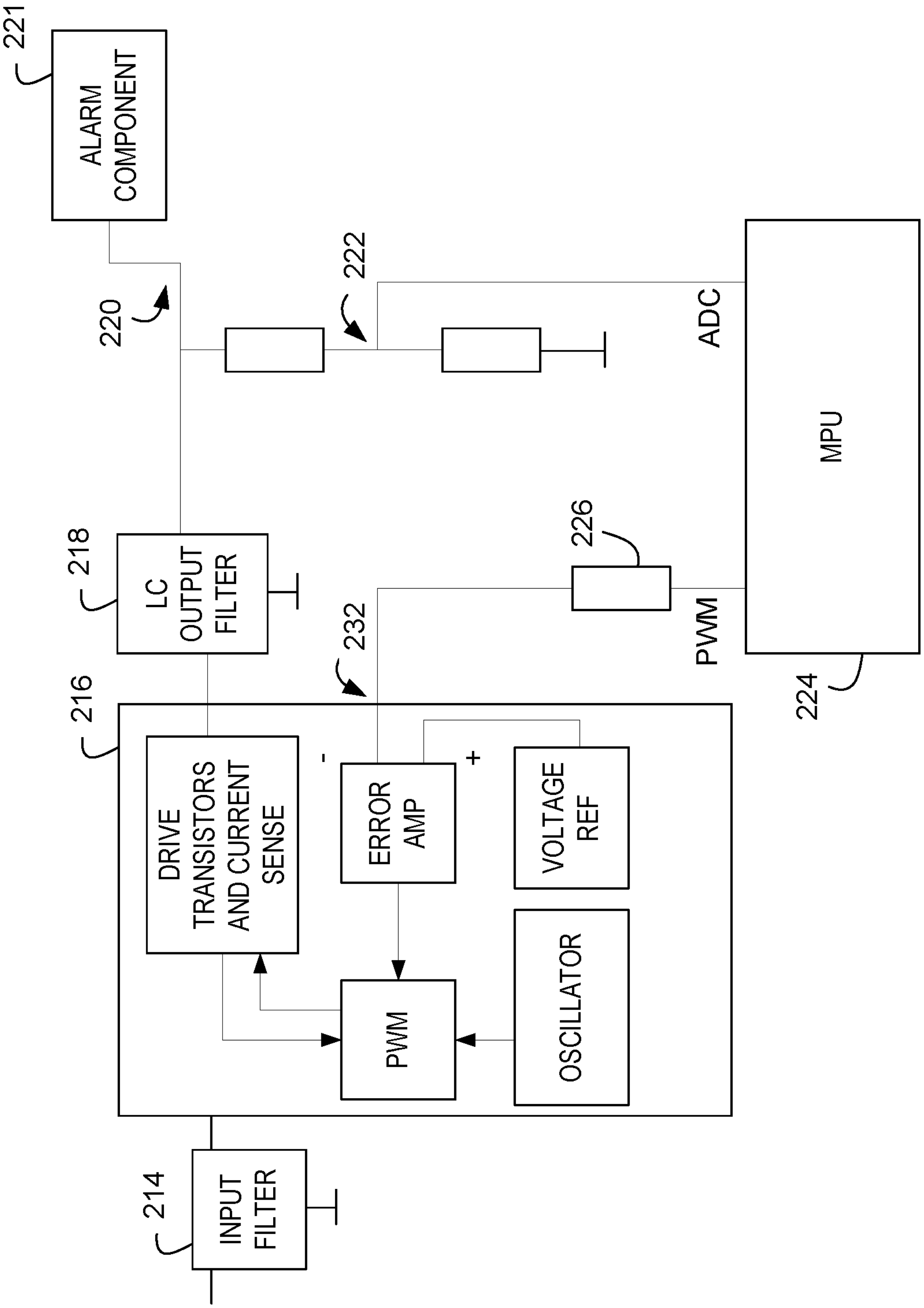
FIG. 2C illustrates components of the circuit illustrated in FIG. 2A used to power an alarm component of a fire alarm device in a second mode.

In an alarm condition, the mode can be switched from the first mode to the second mode. FIG. 2C illustrates components of the circuit illustrated in FIG. 2A used to power an alarm component of a fire alarm device in a second mode. More specifically, FIG. 2C illustrates components of the circuit used to power the alarm component 221 in the second mode as a current source controlled by a digital predictive control loop to provide a low frequency filtering and power function during an alarm condition.

As shown in FIG. 2C, the output 220 is switched to the alarm component 221. The alarm component 221 can include a supercapacitor, a number of LEDs, and/or a piezoelectric sounder. In some embodiments, the supercapacitor powers the LEDs.

The supercapacitor can provide a large instantaneous output pulse current to the alarm component 221. The alarm component 221 can include a boost converter that can amplify (e.g., boost) the voltage provided to the alarm component Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An optical detector for a fire alarm system, comprising:
a self-test component;
an alarm component; and
a power supply, configured to:
operate in a first mode to provide power to the self-test component; and
operate in a second mode to provide power to the alarm component.

2. The device of claim 1, wherein the first mode is a voltage source mode.

3. The device of claim 1, wherein the second mode is a current source mode.

4. The device of claim 1, wherein the first mode is configured to provide a stable voltage to the self-test component.

5. The device of claim 1, wherein the second mode is configured to provide a controlled current to the alarm component.

6. The device of claim 1, wherein the self-test component includes:
a heater coil configured to vaporize a substance; and
a fan configured to move the vaporized substance.

7. The device of claim 6, wherein the power supply includes a pulse width modulation component configured to regulate a speed of the fan.

8. The device of claim 1, wherein the alarm component includes:
a supercapacitor; and
a light-emitting diode (LED).

9. The device of claim 8, wherein the supercapacitor powers the LED.

10. The device of claim 8, wherein the alarm component includes a piezoelectric sounder.

11. A fire alarm system, comprising:
a plurality of optical detectors wired in a loop, wherein each respective one of the plurality of optical detectors includes:
a self-test component;
an alarm component; and
a power supply, configured to:
operate in a first mode to provide power to the self-test component; and
operate in a second mode to provide power to the alarm component.

12. The fire alarm system of claim 11, wherein the loop in which the plurality of alarm devices are wired is an addressable loop.

13. The fire alarm system of claim 11, wherein a length of the loop in which the plurality of alarm devices are wired is greater than or equal to two kilometers.

14. A method for operating an alarm device of a fire alarm system, comprising:
operating a power supply of the alarm device in a first mode to provide power to a self-test module of the alarm device over a first period of time; and
operating the power supply of the alarm device in a second mode to provide power to an alarm module of the alarm device over a second period of time.

15. The method of claim 14, wherein operating the power supply in the first mode to provide power to the self-test module includes:
heating a heater coil of the self-test module such that the heater coil vaporizes a substance; and
moving the vaporized substance using a fan of the self-test module into an optical scatter smoke chamber of the alarm device.

16. The method of claim 14, wherein operating the power supply of the alarm device in the second mode includes charging a supercapacitor.

17. The method of claim 16, wherein the supercapacitor is configured to provide a pulse current to a plurality of light-emitting diodes (LEDs) via a boost converter at an interval.

18. The method of claim 17, wherein the interval is between 0.5 and 2.5 seconds.

19. The method of claim 17, wherein the method includes recharging the supercapacitor between each interval.

20. The method of claim 19, wherein the method includes filtering the pulse current using a predictive control loop.

* * * * *